US006701277B2

(12) United States Patent
Coste et al.

(10) Patent No.: US 6,701,277 B2
(45) Date of Patent: Mar. 2, 2004

(54) ELEVATOR CAR POSITION SENSING SYSTEM

(75) Inventors: Steven D. Coste, Berlin, CT (US); Jason S. Stone, Torrington, CT (US); Julian H. Shull Jr., Southington, CT (US); Richard Schafer, Easthampton, MA (US); Kim Ngoc Trinh, Danbury, CT (US); William G. Edgar, Simsbury, CT (US); Carl Heldwein, Palm Coast, FL (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/226,047

(22) Filed: Aug. 21, 2002

(65) Prior Publication Data

US 2002/0193963 A1 Dec. 19, 2002

Related U.S. Application Data

(62) Division of application No. 09/526,380, filed on Mar. 16, 2000, now Pat. No. 6,526,368.

(51) Int. Cl.[7] .......... G06F 15/00
(52) U.S. Cl. .......... 702/150
(58) Field of Search .......... 702/150, 127; 187/391, 393, 394, 283, 284, 291, 293

(56) References Cited

U.S. PATENT DOCUMENTS

| | | | | |
|---|---|---|---|---|
| 4,493,399 | A | 1/1985 | Kajiyama | 187/291 |
| 4,658,935 | A | 4/1987 | Holland | 187/122 |
| 5,509,505 | A | 4/1996 | Steger et al. | 187/394 |
| 5,637,841 | A | 6/1997 | Dugan et al. | 187/294 |
| 5,747,755 | A | 5/1998 | Coste et al. | 187/394 |
| 6,026,935 | A | 2/2000 | Koh | 187/284 |
| 6,032,761 | A | 3/2000 | Coste et al. | 187/294 |
| 6,073,728 | A | 6/2000 | Olsen et al. | 187/414 |
| 6,082,498 | A | 7/2000 | Coste et al. | 187/284 |

FOREIGN PATENT DOCUMENTS

EP 0 757 966 A1 12/1997

*Primary Examiner*—Judy Nguyen

(57) ABSTRACT

A system of sensing elevator car position is presented that dynamically compensates for problems due to frictional slippage of its mechanical connection and/or building settlement. The system comprises an elevator car within an elevator hoistway. An encoder is mounted within the elevator hoistway and mechanically connected to the elevator car. The mechanical connection drives the encoder which generates data indicative of the position of the elevator car. Either one of a position sensor and a position sensor actuator is mounted to a landing of the hoistway. The other one of the position sensor and position sensor actuator is mounted to the elevator car. The position sensor generates data indicative of the elevator car floor reaching a predetermined distance from the elevator landing when actuated by the position sensor actuator. An elevator position controller receives the data generated by both the position sensor and the encoder. The mechanical connection may include an elevator rope frictionally driving a governor sheave of an elevator speed governor system upon which the encoder is mounted.

7 Claims, 2 Drawing Sheets

| TRANSITION | BINARY OUTPUT | BINARY OUTPUT | DECIMAL |
|---|---|---|---|
| ZONE | SENSOR 140 | SENSOR 142 | EQUIVALENT |
| BELOW 144 | 0 | 1 | 1 |
| BETWEEN 146 & 144 | 1 | 1 | 3 |
| BETWEEN 148 & 146 | 1 | 0 | 2 |
| BETWEEN 150 & 148 | 0 | 0 | 0 |
| BETWEEN 152 & 150 | 1 | 0 | 2 |
| BETWEEN 154 & 152 | 1 | 1 | 3 |
| ABOVE 154 | 0 | 1 | 1 |

ELEVATOR CAR POSITION SENSING SYSTEM

This is a division of copending application Ser. No. 09/526,380 filed Mar. 16, 2000, U.S. Pat. No. 6,526,368, the contents of which are incorporated herein by reference.

TECHNICAL FIELD OF THE INVENTION

The present invention relates to elevator systems and, more particularly, to elevator car position determining systems.

BACKGROUND OF THE INVENTION

In the operation of elevator systems, it is desirable to stop an elevator smoothly and level with the landing for safety and comfort. In order to achieve a smooth, accurate stop the elevator system must initiate the elevator stop at the right moment in time. The leveling mode of operation and commencement of door opening must be timed properly. Most elevator doors begin opening a predetermined distance before the elevator car is actually level with the landing in order to speed up passenger transfer (the "door zones"). To perform these functions for safe and accurate operation, it is necessary to monitor the exact vertical location of the elevator car at all times.

Prior art elevator car position determining systems typically utilize "tape/sheave" systems to monitor elevator car position. That is, a tape is connected directly to the elevator car and follows the elevator car's vertical movement. The tape drives a sheave, which is typically located at the top of the elevator hoistway. The tape/sheave interface is a dedicated and positive traction mechanical connection. The sheave in turn drives a position encoder, i.e., a device to transfer positional data from one system of communication into another, which transmits precise positional data to an elevator controller once the system is properly calibrated. For example, high-rise elevator systems use either a digital encoder or primary position transducer (PPT) to provide elevator car position information to the elevator controller. The PPT is a digital encoder that is located in the machine room over the hoistway. Its rotatable component is driven by a steel-toothed tape that is attached to and runs with the elevator car when the car undergoes vertical movement.

To supplement positional information provided by the tape/sheave system, sets of steel bars or vanes are positioned throughout the hoistway so that position sensors mounted on the elevator car are actuated by the vanes (position sensor actuators) as the car moves vertically past. The vanes are typically mounted on the elevator guide rails or on a floating steel tape running the length of the hoistway.

The vanes located proximate to each elevator landing are called "landing vanes" and are used to mark approximate distances from the landing within which the elevator doors begin to open, necessitating coarse (outer door zone) and fine (inner door zone) adjustments to the elevator speed. Additionally, the landing vanes mark the approximate distance within which very fine adjustments are made to the elevator speed as the elevator car floor is leveled with the landing (the leveling zone). Typically, primary positional information is transmitted by the calibrated encoder of the tape/sheave system, while prior art landing vanes provide a rough check thereof.

"Absolute position vanes" define physical and absolute positions in the hoistway, for the purpose of calibration upon installation or when the elevator car position is otherwise unknown, e.g., after a power failure where position information may be lost. Also, an "up travel required" vane is located in the bottom of the hoistway. The up travel required vane extends from just above the bottom distal end of the lowermost absolute position vane down to the extreme mechanical hard limit of the elevator car's travel, i.e., full buffer compression. Detection of the up travel required vane indicates that the elevator car must be run in the "up" direction rather than the normal default direction of "down", when establishing an absolute position reference during a learning, i.e., calibration, run.

The system is initially calibrated upon installation, whereby a technician will put the elevator system through a semiautomatic "learning run". During a learning run, the technician manually positions the elevator car at a specific initial position in the hoistway, e.g., at a point below the lowest absolute position vane. The technician will perform several runs from the initial position to determine, i.e., learn, the precise distances from the initial position to the transition edges of each vane. The position encoder will output a running pulse stream indicative of elevator car position relative to the initial position of the learn run. The precise position values corresponding to the transition edges of each landing are counted by a position counter and stored in a landing table as reference values. The reference values in the landing table are used to confirm elevator car position and are typically only adjusted when a new learn run is required.

However, "tape/sheave" systems, e.g., the Otis Elevonic 401 and 411 systems, are subject to wear and tape breakage, thereby disabling the elevator system until the tape is replaced. The replacement process is time consuming and expensive. In addition, such systems require additional and dedicated mechanical and/or electrical components that require installation, repair, maintenance and adjustment, all adding to the overall cost of the elevator system.

Because it is necessary for the position monitoring system to indicate the exact vertical location of the elevator car at all times, the prior art tape/sheave systems maintain a tape/sheave interface that has a positive traction, i.e., non-slip, mechanical connection. The precise position requirements make it difficult to substitute the dedicated tape/sheave components with other existing mechanical connections already present in the elevator system that are less prone to wear and breakage, but more prone to slippage. For example, the existing mechanical connection of the elevator's safety system is a sheave mounted on a speed governor that is frictionally driven by a highly reliable wire rope connected to the elevator car. However, the accuracy of such a mechanical connection is less than ideal when used to determine the elevator car's position, since it is heavily dependant on the frictional characteristics of the rope with the sheave. If such a connection were to be used, then as the wire rope slips over the sheave, the accuracy of the position data would be degraded. Therefore, compensating for this would be necessary since position cannot be guaranteed.

Moreover, prior art position determining systems, such as the tape/sheave systems, do not compensate for building settling phenomena. As a building settles over time, the location of a particular elevator landing relative to a specific calibration point in the elevator hoistway may change. Problematically, the landing vanes may also shift location independent of the changing locations of the landings, therefore significantly degrading the accuracy of the landing vanes' positional information. This problem becomes more significant the higher the rise of the building. The settling phenomena in a tall building can require technicians to perform a new "learning run" as often as twice a year, thus incurring significant down time and expense to maintain the accuracy of the position determining system.

SUMMARY OF THE INVENTION

This invention offers advantages and alternatives over the prior art by providing a system of sensing elevator car position that dynamically compensates for problems due to frictional slippage of its mechanical connection between the elevator car and an encoder, and/or building settlement phenomena. Advantageously, the invention enables the position sensing system to be integrated into existing elevator systems, e.g., having an elevator speed governor system, in order to increase reliability and decrease cost. Moreover, by dynamically compensating for building settlement, the number of learning runs that have to be performed in the field are significantly reduced.

These and other advantages are accomplished in an exemplary embodiment of the invention by providing an elevator car position sensing system comprising an elevator car within an elevator hoistway of a building. An encoder is mounted within the elevator hoistway and mechanically connected to the elevator car, wherein the mechanical connection drives the encoder such that the encoder generates data indicative of the position of the elevator car within the hoistway. Either one of a position sensor and a position sensor actuator is mounted in fixed relation to a landing of the hoistway. The other one of the position sensor and position sensor actuator is mounted in fixed relation to the elevator car. The position sensor generates data indicative of the elevator car floor reaching a predetermined distance from the elevator landing when actuated by the position sensor actuator. An elevator position controller receives the data generated by both the position sensor and the encoder.

In an alternative embodiment of the invention, the mechanical connection comprises an elevator rope frictionally driving a governor sheave of an elevator speed governor system upon which the encoder is mounted. The elevator position controller utilizes data from the position sensor to dynamically compensate for degradation of positional data generated from the encoder due to frictional slippage of the rope.

In another alternative embodiment of the position sensing system, either one of the position sensor and the position sensor actuator mounted in fixed relation to the landing follows the changing location of the landing as the building settles. The elevator position controller utilizes data from the position sensor to dynamically compensate for degradation of positional data generated from the encoder due to the changing location of the landing as the building settles.

An alternative embodiment of the present invention utilizes an existing Emergency Terminal Speed Limiting Device (ETSLD), reference ANSI A17.1 of the Elevator Code, to substitute for dedicated absolute position vanes. The ETSLD is typically a set of positional vanes used in "reduced stroke buffer" elevator systems to indicate speed and to keep the elevator car from going above a predetermined speed. By integrating the elevator car position tracking system with the ETSLD, mechanical component requirements and, thus, space requirements and maintenance costs are reduced.

The above-discussed and other features and advantages of the present invention will be appreciated and understood by those skilled in the art from the following detailed description and drawings.

DESCRIPTION OF THE PREFERRED EMBODIMENTS

Figure 1:
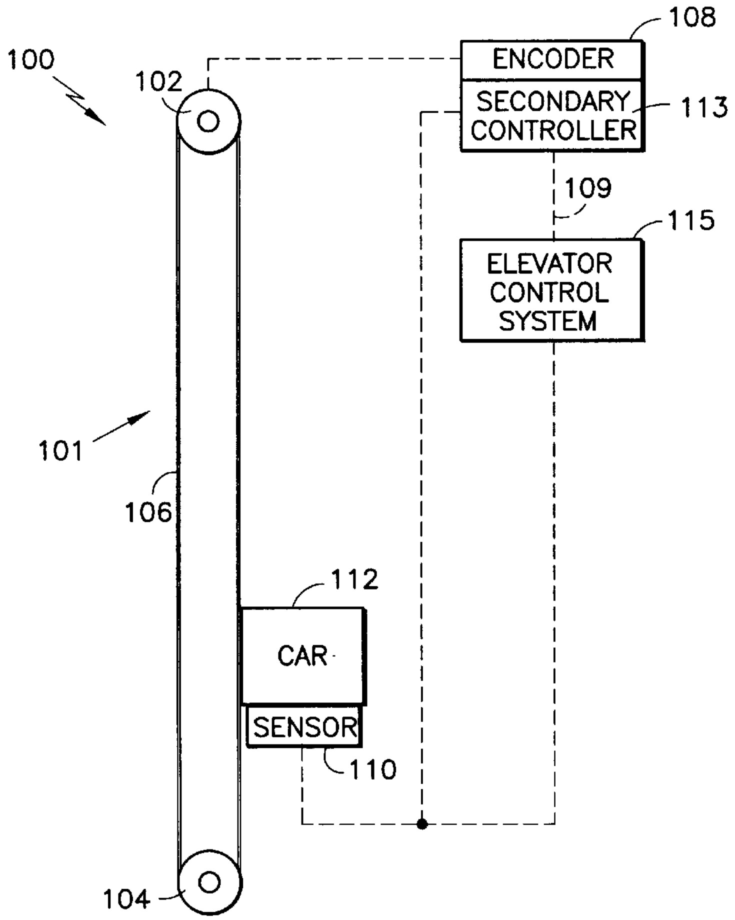
FIG. 1 is a schematic view of an elevator car speed governor system and components in accordance with the present invention.

An exemplary embodiment of an elevator car position sensing system 100 according to the present invention is illustrated in FIG. 1. The position sensing system 100 is integrated into an existing elevator speed governor system 101 to reduce the number of dedicated components required. The elevator speed governor system 101 comprises an upper governor sheave 102, a lower governor sheave 104, and a governor rope 106.

The governor rope 106 runs from an elevator car 112 to frictionally drive the governor sheave 102 located at the top of the elevator hoistway (not shown). The mechanical connection of the rope 106 and sheave 102 of the speed governor system 101 is less prone to breakage than prior art tape/sheave systems. However, the accuracy of the mechanical connection between the rope 106 and sheave 102 is less than ideal when used to determine the elevator car's position, since it is heavily dependant on the frictional characteristics of the rope 106 with the sheave 102. However, as will be discussed in greater detail hereinbelow, the position sensing system 100 of the present invention dynamically compensates for problems due to slippage of this mechanical connection and/or building settlement phenomena.

A digital shaft encoder 108 is mounted on the upper governor sheave 102. The shaft encoder 108 provides signals indicative of position and related time values for elevator car 112 displacement, e.g. running position counter values. 112 is adapted for vertical movement in a vertical elevator hoistway (not shown). The sensors 110 include landing detection sensors 124, 126 and 128, (best seen in FIG. 2), absolute position sensors 140 and 142 (best shown in FIG. 3), and an "up travel required" sensor 158 (best shown in FIG. 3). The position sensors comprise a light beam focused on a photo-detector wherein, when the beam is interrupted by a position sensor actuator, the sensor is turned "on" to indicate the detection of a position. Through beam and photo-detector type sensors are described in this embodiment however, other position sensors are also within the scope of this invention, e.g., magnetic, retro-reflective, electromechanical or other photo-electric devices. A secondary controller 113 is provided to store and process elevator car the position and timing data from the encoder 108 and elevator car position data from the sensors 110. This enables the secondary controller 113 to relate the data for determining elevator car position at a given moment in time. The secondary controller 113 is in operative communication with the main elevator control system 115. Both the secondary controller 113 and the main elevator control system 115 typically comprise microprocessor-based systems well known in the art. The systems 113 and 115 further typically include input/output devices for receiving and transmitting data, RAM (random access memory), ROM (read only memory), EEPROM (electronic erasable programmable read only memory) and Flash BEPROM, all of which interface with the microprocessor. By way of example, the control systems 113 and 115 may include a computer, a programmable controller or a dedicated integrated circuit.

Figure 2:
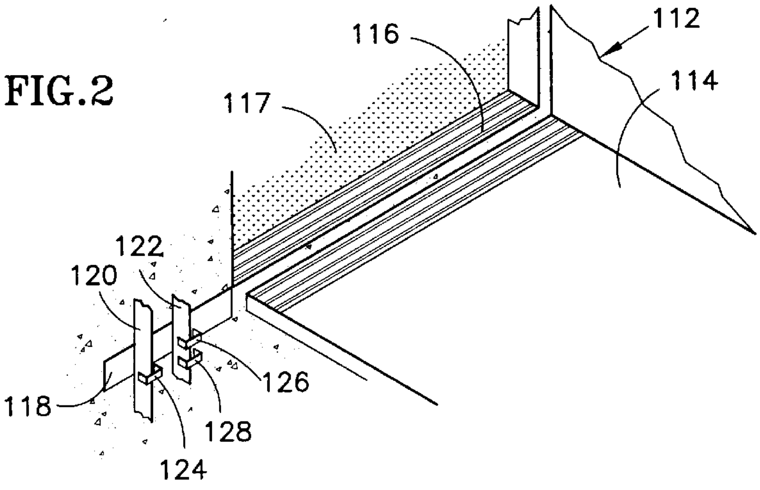
FIG. 2 is a partial, schematic view of the juncture of an elevator car and an elevator landing in accordance with the present invention.

Referring to FIG. 2, a perspective illustration shows an elevator car floor 114 and an elevator sill plate 116 of a landing approximately aligned vertically with each other. The sill plate 116 is integrally connected to, and level with, the elevator landing 117 to provide easy passage for the passengers to and from the elevator car. An elevator sill plate mounting bracket 118, rigidly attached to the elevator sill plate 116, is precisely aligned and mounted level with the elevator sill plate 116. Two vertical landing vanes 120, 122, functioning as position sensor actuators, are mounted in fixed relation to the sill 116, each having predefined lengths and each being vertically centered with respect to the sill 116. A first landing position sensor 124 and a set of second landing position sensors 126, 128 are fixed to the elevator car 112 such that they are positioned to cooperate with a respective one of the first and second landing vane 120, 122. As the elevator car 112 approaches the sill 116, the leading edges of the vanes 120 and 122 will break the beams of there associated sensors 124, 126 and 128 to indicate to the controller 113 that the elevator car floor 114 has reached a certain position relative to the sill 116 and its associated landing.

Though the position sensor actuators are described in this embodiment as being of the vane type, other position sensor actuators are also within the scope of this invention, e.g., magnetic, retro-reflective, electromechanical or other photoelectric devices. Also it will be clear to one skilled in the art that the position sensor actuators can be mounted on the elevator car 112, while the position sensors can be mounted on the sill 116.

Landing vane 120 has a greater length than landing vane 122 and its leading edges, i.e., distal ends, are located a first predetermined distance from the landing 116, e.g., 228 mm, to define the "outer door zone" of the landing 116. The first landing sensor 124 is turned "on" when it reaches one of the leading edges of landing vane 120 to enable the elevator car 112 to make coarse adjustments in its speed as the elevator car floor 114 approaches the landing and its associated sill 116.

The leading edges of landing vane 122 are located a second predetermined distance, e.g., 76 mm, from the sill 116 to define the "inner door zone" in which fine adjustments are made to the speed of the elevator car 112 as the car floor 114 approaches the sill 116. Depending on whether the elevator car 112 is approaching the sill 116 from above or below, either one of the second set of landing sensors 126 or 128 will be turned "on", indicating that the elevator car floor 114 is within the second predetermined distance. Additionally, a third predetermined distance, e.g., 12 mm, of the elevator car floor 114 from the sill 116 is indicated when all three sensors 124, 126 and 128 are turned "on", defining the level zone.

Advantageously by mounting the landing vanes 120, 122 on the sill 116, the location of the landing vanes 120, 122 will precisely follow the changing location of the landing as the building settles. Therefore, the leading edges of the landing vanes 120, 122 provide a precise set of position check points a predetermined distance from the landing and its associated sill 116, as opposed to the approximate positional information provided by prior art landing vanes.

By mounting the landing vanes 120, 122 on the sill 116, the positional data transmitted from their associated sensors 124, 126 and 128 is utilized by the elevator control system 115 to dynamically compensate for degradation of the calibrated position data due to frictional slippage of the governor rope 106. Additionally, the control system 115 compensates for landing position changes due to building settlement. The ability to dynamically compensate for frictional and settlement problems enables the position sensing system 100 to utilize the very durable friction drive mechanical connection of the rope 106 and sheave 102 within the speed governor system 101. This arrangement reduces the number of dedicated components, and eliminates the more fragile tape/sheave system typically used to detect position of the elevator car. Moreover, the number of "learning runs" required to recalibrate the system 100 as the building settles with time is eliminated. These features represent a significant savings in terms of cost and down time, especially in tall buildings utilizing high performance elevators.

By way of example, in this embodiment a position correction event occurs whenever sensors 126 or 128, mounted on the elevator car 112, interact with the leading edge of landing vane 122 of a targeted landing 117, i.e., a landing that the elevator car stops at. Other leading edges may also be used to define position correction events, e.g., leading edge of 120 interacting with 124, and are considered within the scope of this invention.

When a position correction event occurs, the value of a running position counter (not shown) within secondary controller 113 that counts the pulses from the signal output by the encoder 108 is captured as a first running position counter value. Main elevator control system 115 has a stored landing table (not shown) with reference values that were generated from a previous learn run. Upon initiation of the correction event, main elevator control system 115 selects the corresponding reference value from the landing table and transmits it to controller 113. When controller 113 receives the reference value from main elevator control system 115 by way of the communication link 109, it captures a second running position counter value from the running position counter and takes the difference between the first and second running position counter, and then adjusts the reference value by that amount (including the algebraic sign) before writing that reference value into the running position counter. This eliminates all immediate error in order to eliminate any error associated with the distance the car traveled during the time taken to transmit the reference value from main elevator control system 115 to controller 113 accurately stop at landing 117, whatever the source including:

(1) errors due to distance traveled by the elevator car 112 during the time between the initiation of the position correction event and the receipt by the secondary controller 113 of a reference value from the main controller 115;

(2) errors due to frictional slippage of rope 106; and (3) errors due to building settlement.

Though this exemplary embodiment describes controllers 113 and 115 as remote, it will be clear to one skilled in the art that a single controller may also be used. In that case, there would be no transmission time latency error, and therefore errors due to (1) above would be negligible. Measurement of error due to frictional slippage of rope 113 and building settlement is accomplished by a simple comparison of the recorded position counter value at the correction event and the unadjusted reference value.

Additionally in this exemplary embodiment, a low pass filter algorithm for each landing 117 is used to separate error due to the long-term effects of building settlement and those due to frictional slippage. In this embodiment, the adjusted reference value (as described above) is stored by the secondary controller 113 when the position correction event occurs. The adjusted reference value is compared by controller 113 against the reference value transmitted by 115. This signed difference is sent back to the main controller 115 by secondary controller 113 as:

(1) an acknowledge that the position counter correction actually did occur; and (2) an indication by how much (high or low) the position counter was deviant from the reference value.

When this signed difference value is received by controller 115, it is provided as input to that landing's low pass filter (one per landing). Once a statistically representative minimum number of position correction events have been made at a given landing (validating the filter output for analysis), the output of this low pass filter is compared against a maximum magnitude threshold. Should the filter's output indicate a long-term deviation of greater than this threshold, that landing's entries in the landing reference table are automatically adjusted by the amount of the filter output, while taking into account the polarity of the deviation. That landing's filter history is then reset and the process repeats. This eliminates the need for periodic semi-automatic learn runs as is currently the case with the prior art.

As an additional measure in this embodiment, in order to further compensate for communication delays between remote controllers, a precise timer (not shown) is contained in each of the secondary controller 113 and the main controller 115, with the timers being synchronized upon exiting the inner door zone. All recorded position and calculated velocity values are time-stamped. This time data is processed with elevator car velocity data. The main control 115 computes the distance traveled by the elevator car 112 during data transmission by taking the difference between the transmission initiation and reception times and uses the velocity data to determine the distance traveled. The received position value is then compensated by that amount prior to being used by the control functions.

Figures 3, 4:
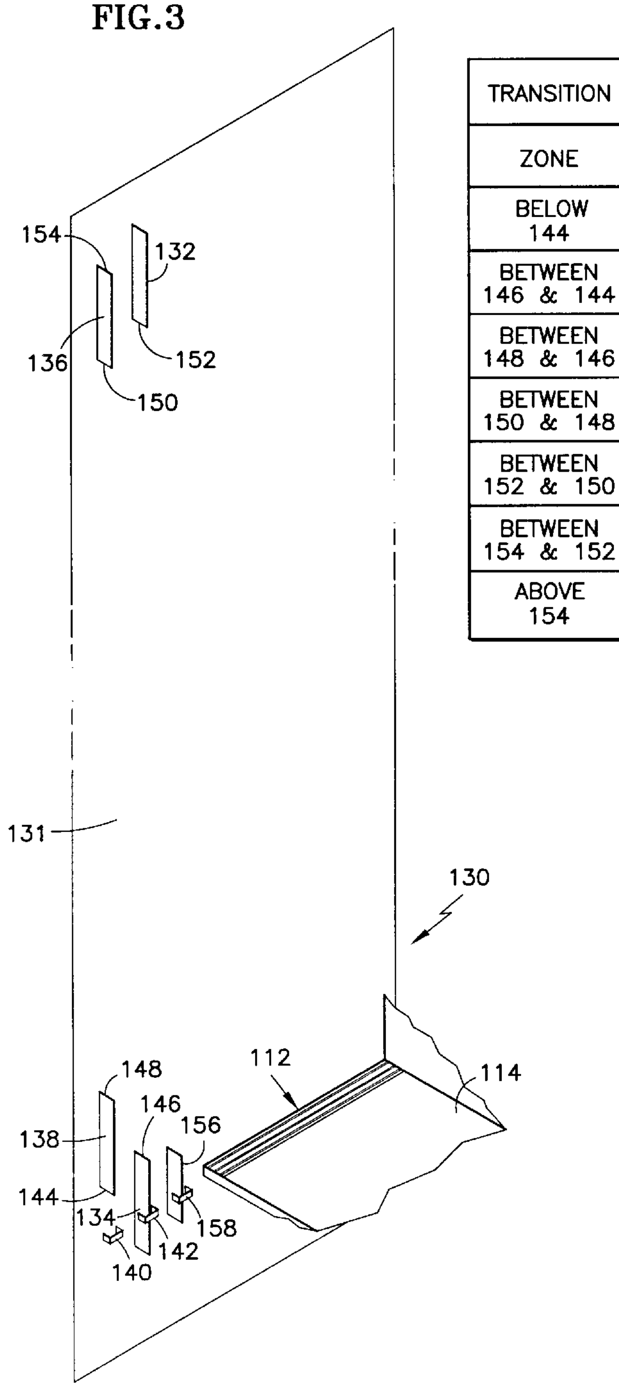
FIG. 3 is a partial, schematic view of vanes of an ETSLD arranged in a hoistway in accordance with the present invention.
FIG. 4 is a table of the binary output of absolute position sensors actuated by the ETSLD vanes of FIG. 4.

Referring to FIG. 3, an alternative embodiment of the present invention utilizes an existing Emergency Terminal Speed Limiting Device (ETSLD) 130, reference ANSI A17.1 of the Elevator Code, to substitute for dedicated absolute position vanes in the position sensing system 100. The ETSLD 130 typically comprises a set of vanes 132, 134, 136 and 138 used in "reduced stroke buffer" elevator systems to determine elevator car velocity at specific hoistway positions and to keep the elevator car from going above a predetermined terminal speed. By integrating the ETSLD 130 with the elevator car position tracking system 100, for the sole purpose of initial absolute position detection, the vanes 132, 134, 136 and 138 of the ETSLD 130 eliminate the need for additional absolute sensors, resulting in a significant reduction in space requirements and hardware costs.

The ETSLD vanes 132, 134, 136 and 138 are located with respect to the elevator hoistway 131. An upper ETSLD vane 132 and a lower ETSLD vane 134 are disposed at the upper and lower extremes of the hoistway 131. The ETSLD vanes 132 and 134 cooperate with a corresponding first absolute position sensor 142, which is mounted to the elevator car 112.

Two intermediate ETSLD vanes 136, 138 are disposed in overlapping arrangement with each of upper 132 and lower 134 ETSLD vanes respectively. The ETSLD vanes 136, 138 cooperate with a corresponding second absolute position sensor 140, which is also mounted to the elevator car 112. The leading edges 144, 146, 148, 150, 152 and 154 of the ETSLD vanes define transition points in which either position sensor 140 or 142 change state from a logical 1 (on) to a logical 0 (off), or vice versa.

An "up travel required" vane 156 is located in the bottom of the hoistway 131. The up travel required vane 156 extends from just above leading edge 144 down to the extreme mechanical hard limit of the elevator car's travel, i.e., full buffer compression. The up travel required vane 156 cooperates with up travel required sensor 158, which is also mounted to the elevator car 112. Detection of the up travel required vane 156 indicates that the elevator car must be run in the "up" direction, rather than the normal default direction of "down", when establishing an absolute position reference.

Referring to FIG. 4, absolute position is determined by examining the first and second absolute position sensors 140 and 142 as a two bit binary number, which changes at the precise location of each leading edge or transition point. When combined with the known direction ("up" or "down" of the elevator car), six unique transition points can be recognized. By way of example (as shown in FIG. 4), if the elevator system experiences a power failure where stored position is lost and later "wakes up" with the elevator car 112 located above the leading edge 154 of ETSLD vane 136 (top of the hoistway) the combined output of sensors 140 and 142 will be a binary 1. If the elevator car is made to move in its default direction of "down", the output will transition from 1 to 3 at the leading edge or transition point 154, thus establishing the precise position of the elevator car 112. If the elevator car were to traverse the entire hoistway, the binary output would undergo six transitions which uniquely identify each transition point, i.e., from 1 to 3 at point 154, from 3 to 2 at point 152, from 2 to 0 at point, 150, from 0 to 2 at point 148, from 2 to 3 at point 146 and from 3 to 1 at point 144. By utilizing these six unique transition points of the ETSLD 130, the running time when attempting to establish an absolute position reference is minimized without adding cost.

While the preferred embodiment has been herein described, it is acknowledged and understood that modification may be made without varying outside the scope of the presently claimed invention.

What is claimed is:

1. A method for generating a position signal for indicating a position of an elevator car within a hoistway, the hoistway including an elevator landing, one of a position actuator and position sensor located proximate the landing, the car including the other one of said position actuator and position sensor, the elevator car drivingly coupled to an encoder for generating an encoder signal indicative of the position of the car within the hoistway, and a controller in communication with the encoder and position sensor, the controller including a reference table having reference value the method comprising the steps of:

generating a position correction event signal upon actuation of the position sensor by the position actuator indicating the elevator car is located proximate the landing;

capturing a first running position counter value from the running position counter upon generation of the position correction event signal;

reading the reference value from the reference table;

capturing a second running position counter value from the running position counter;

comparing the first running position counter value to the second running position counter value to determine a difference value;

modifying the reference value by the difference value; and, providing the modified reference value as the position signal.

2. The method of claim 1 further comprising the steps of:

determining whether a statistically significant number of position correction event signals has occurred;

comparing the difference value to a threshold value when the statistically significant number of position correction events has occurred;

modifying the reference value by the difference value; and storing the modified reference value in the reference table as the reference value.

3. The method of claim 1 further comprising driving the encoder with an elevator rope.

4. The method of claim 1 further comprising mounting the encoder on a governor sheave of an elevator speed governor system.

5. The method of claim 1 wherein the one of the position sensor and the position actuator is mounted to an elevator sill of the landing.

6. A method for generating a position signal for indicating a position of an elevator car within a hoistway, the hoistway including an elevator landing, one of a position actuator and position sensor located proximate the landing, the car including the other one of said position actuator and position sensor, the elevator car drivingly coupled to an encoder for generating an encoder signal indicative of the position of the car within the hoistway, and a first controller in communication with the encoder and position sensor and including a running position counter for storing the encoder signal, and a second controller in communication with the first controller and position sensor and including a reference table having reference value the method comprising the steps of:

generating a position correction event signal upon actuation of the position sensor by the position actuator indicating the elevator car is located proximate the landing;

capturing a first running position counter value from the running position counter upon generation of the position correction event signal;

communicating the reference value from the first controller to the second controller;

capturing a second running position counter value from the running position counter upon receipt of the reference value by the first controller;

computing a difference value equal to the difference between the first and second running position counter values;

modifying the reference value by the difference value; and, providing the modified reference value as the position signal.

7. The method of claim 6, further comprising the steps of:

comparing the modified reference value to the reference value to determine the difference value;

determining whether a statistically significant number of position correction event signals has occurred;

comparing the difference value to a threshold value when the statistically significant number of position correction events has occurred;

modifying the reference value by the difference value; and storing the modified reference value in the reference table as the reference value.

* * * * *